A. G. WALTER & B. M. INMAN.
DEODORIZING AND DISINFECTING DEVICE.
APPLICATION FILED MAR. 11, 1908.
915,000.
Patented Mar. 9, 1909.
2 SHEETS—SHEET 2.
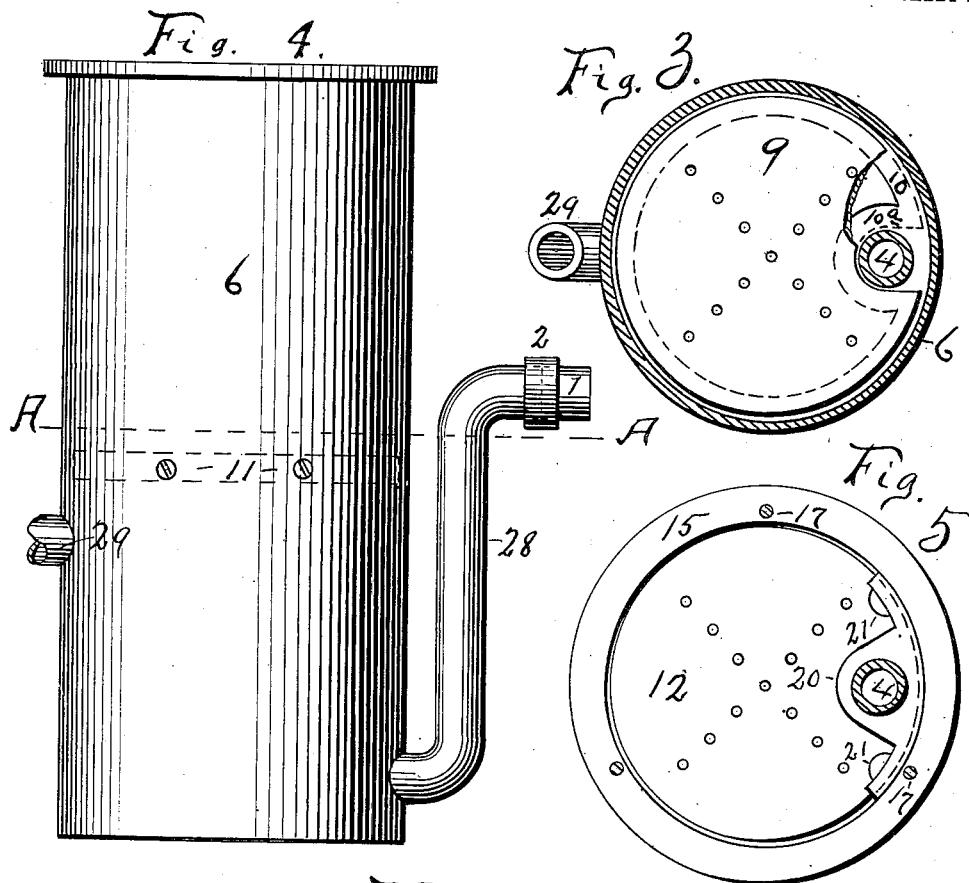
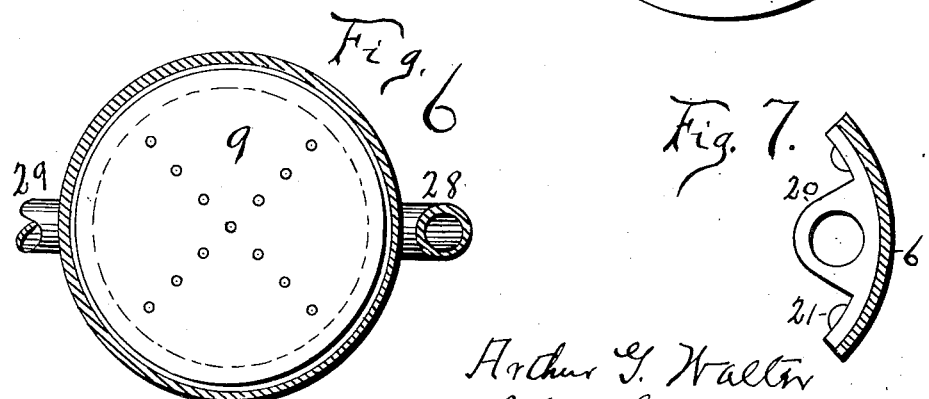

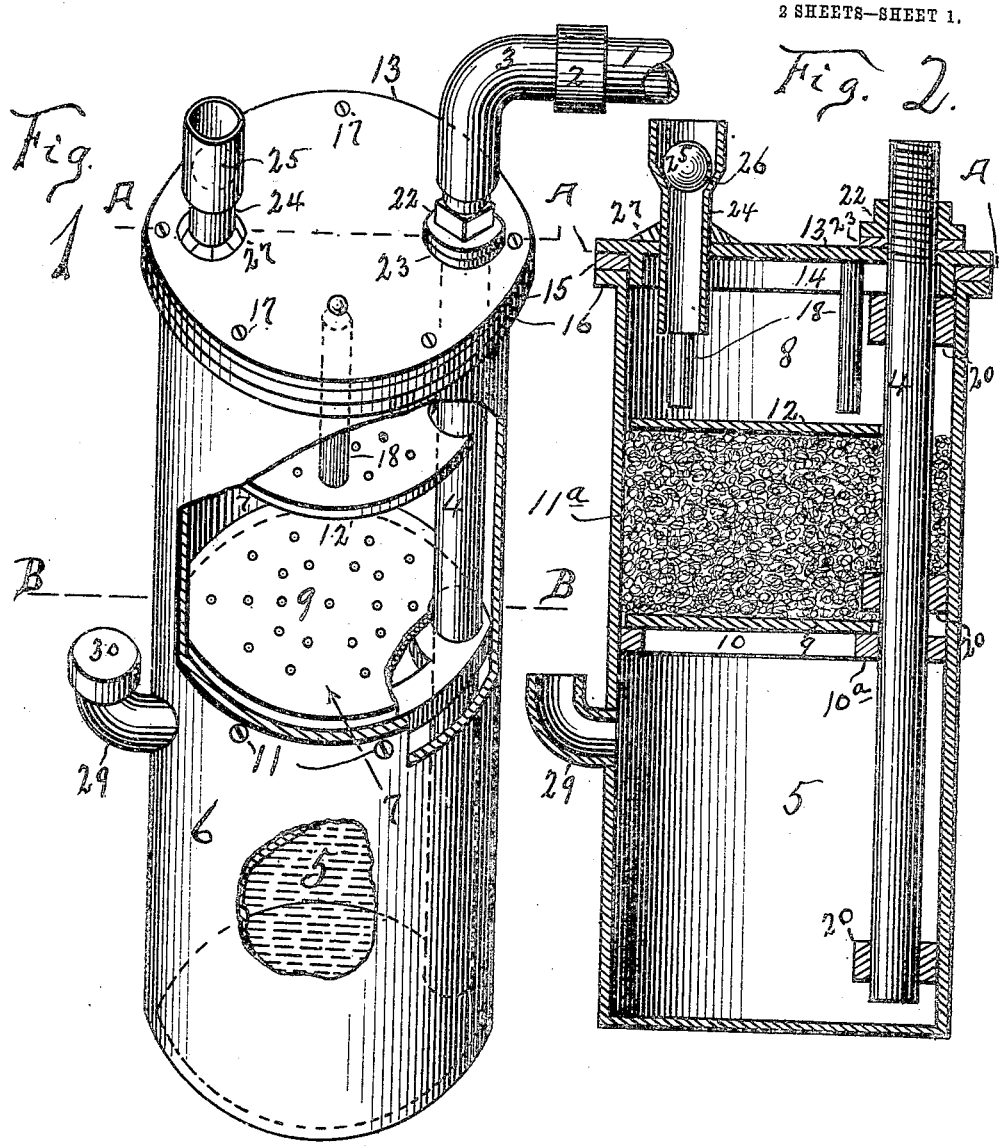

UNITED STATES PATENT OFFICE.

ARTHUR G. WALTER AND B. M. INMAN, OF FREMONT, OHIO, ASSIGNORS TO THE NATIONAL MAUSOLEUM COMPANY, OF SHELBY, OHIO.

DEODORIZING AND DISINFECTING DEVICE.

No. 915,000.　　　　　Specification of Letters Patent.　　　Patented March 9, 1909.

Application filed March 11, 1908. Serial No. 420,365.

*To all whom it may concern:*

Be it known that we, ARTHUR G. WALTER and B. M. INMAN, citizens of the United States, residing at Fremont, in the county of Sandusky and State of Ohio, have invented certain new and useful Improvements in Deodorizing and Disinfecting Devices, of which the following is a specification.

Broadly speaking, our invention relates to devices for deodorizing and purifying deleterious gases; but more specifically to a combination of means, the purpose and object of which is to receive, and deodorize, disinfect, and purify the deleterious and other gases which arise from the decomposition of the human body, when deposited in hermetically sealed caskets, or in similar receptacles, in vaults, mausoleums, or catacombs.

Referring to the drawings herewith: Figure 1 represents a perspective view of the preferred construction of our device; a portion of the side wall being broken away to show parts within. Fig. 2 represents a vertical cross section on the line A A of Fig. 1. Fig. 3 represents a cross section on the line B B of Fig. 1. Fig. 4 represents in part a modified construction of our device, the cover being omitted. Fig. 5 represents a cross section on the line A A of Fig. 2. Fig. 6 represents a cross section on the line A A of Fig. 4. Fig. 7 represents a detail.

Coming now to a more specific description of our invention: However the body may be ensealed, whether in leaden casket, or in a crypt of a vault, mausoleum or catacomb, the intent is that a suitable pipe or tube 1 shall be connected therewith. In the drawings said tube is supposed to lead therefrom. At the outer end, by means of a suitable coupling 2, the same is connected to an elbow 3 which is screw threaded to the upper end of a discharging pipe 4 which leads to a chamber 5 which forms the lower compartment of a receiving tank 6. Normally said tank is divided into three compartments; the lower compartment 5; the middle compartment 7; and an upper compartment or air chamber 8. The lower and middle compartments are separated by a perforated plate 9 which rests upon a ledge 10. Said ledge may be integral with the walls of the tank; but preferably is made separate therefrom, and is held in place by suitable screws 11, the periphery thereof being made to closely conform to the inner surface of said tank. Said ledge not only supports said plate, but, by reason of said close conformity, and by reason of the same being given a suitable projection for the purpose, it is made to perform still another function which will be explained subsequently. In the practical use of this device said lower compartment is made to contain some suitable disinfectant such as formaldehyde; and the middle compartment is filled with a suitable germ filtering material 11$^a$, for purposes, and as, hereinafter explained.

The perforated plate 12 is a duplicate in all respects of the plate 9, and when in place, is made to separate the middle from the upper compartment. Said tank, at its top, is closed by a suitable cover 13, having a guide flange 14. It is intended that said tank should be air tight; and to that end, a suitable gasket 15 is interposed between said cover, and the flange 16 which projects outward from said tank. Said cover, when in place, is secured by suitable screws or bolts 17. Normally, the plate 12 has no other support than the contents of the middle compartment; and in order that it shall be held down, and be made to bear upon said contents, said cover is provided with suitable studs 18 which project into said tank, and engage said plate. Said pipe 4 is held in place by means of suitable brackets 20 which are secured to the wall of said tank by rivets 21. 22 is a jam nut. In order that no gases may escape around said pipe where it enters said cover, a suitable gasket 23 is interposed between said nut and cover; and likewise, so that all gases which are made to enter the chamber 5 through said discharging pipe 4, shall be compelled to rise through the intervening filter, after passing through said disinfectant, not only said ledge 10 is made to conform closely to the walls of said tank, but said ledge is provided with an inwardly projecting portion 10$^a$, and said pipe is made to tightly pass through a suitable opening therein; said projection being made to extend inward sufficiently, so that the projection outside of said pipe will correspond with that of the ledge proper. While we have said that said ledge is made to conform closely to the walls of said tank, and that said discharging pipe is made to pass tightly through an opening in said portion 10$^a$, it should be understood that the purpose is to produce germ tight joints, and therefore said joints may be soldered or otherwise closed, instead of making a mechanically tight joint.

Ordinarily speaking, either the liquid disinfectant, or the vapors arising therefrom, is destructive of germ life; but in exceptional cases, when the gases come with much force, and consequent velocity, more time is required to effect its destruction than is permitted under such circumstances. In such cases, and so that said germs may be arrested and detained, and thereby be subjected to the action of said vapors a sufficient time to effect their absolute destruction said gases are made to pass through a suitable filter placed within said middle compartment, such as will afford a complete bar to the path of said germs. While other material may be used for the purpose, we recommend for said purpose a fibrous material, such as cotton. As shown in Fig. 2, said discharging pipe is made to reach near the bottom of said tank, for obvious reasons; and thus, as said gases are compelled to pass through a sufficient quantity of said disinfectant, and thence through said filter, all poisonous or infectious germs are sooner or later destroyed, and the residuary gases which find their way into the air chamber, become both purified and deodorized. So that said purified and deodorized gases may escape to the outer air, when said air chamber becomes charged therewith, we provide an outlet pipe 24, which is controlled by a suitable ball valve. In Fig. 2 said pipe is cut in vertical section, showing the ball 25 resting in a seat 26. An air tight joint is made around said pipe by means of solder 27, or in any other suitable manner.

As heretofore stated, we prefer the construction shown in Figs. 1 and 2; and this is chiefly, if not altogether, because of the stiffening effect resulting from the use of the long tube 4, thus permitting the use of lighter material for the tank.

In the modified form, shown in Fig. 4, the inlet pipe 28 performs the same office as the discharging pipe 4 of Figs. 1 and 2.

It is intended that, for the better deodorizing of the deleterious gases, the vapors arising from the disinfecting material may freely pass in the direction of the decomposing body; but to prevent it from passing to the outer air, and thus wasting its substance, said ball valve is provided. Manifestly, as the purified gases force their way outward through said valve, some portion of said vapor will of necessity pass therewith; but this cannot be avoided.

For the purpose of filling the chamber 5 with disinfectant we provide an inlet 29 which has a closing cap 30. Manifestly said inlet has no certain dimensions, but from preference, it is made of length such that only the proper amount of liquid can be put into the tank. In order that our device may be light and portable, we prefer to make the same of metal, and preferably of copper, though manifestly other material may be used.

We recommend, as sufficient for the purpose, a tank of twelve inches diameter, and with a height of twenty-four inches. Said tank we then divide so that the lower compartment shall be given substantially one half the total capacity of the tank; and we so divide the residue that the air chamber is given substantially one sixth of its total capacity; and we recommend, as sufficient for the purpose, that the connecting pipe 1 be given a diameter of one inch, while the outlet pipe we make of three fourths inch diameter. Said ball valve may be of any standard pattern. Manifestly these dimensions should be increased where a large amount of labor is to be performed; but we recommend these as sufficient to care for all gases which may arise from a score of decomposing bodies. In order that said ball valve may serve its intended purpose, viz., to economize in the use of disinfectant, and at the same time be made to yield, as occasion requires, we recommend that for all ordinary uses, it be made to yield under a pressure of not exceeding five pounds.

Having now fully described our invention, what we claim as new, is:

1. A device of the character described which comprises a receiving tank; a perforated division plate, and a ledge for the support thereof, said ledge extending in a horizontal plane continuously around, and being secured to the inner surface of the walls of said tank with a germ and air tight joint therebetween, the compartment or chamber below said plate being adapted to receive and contain a fluid for disinfecting purposes; a cover for said tank, a gasket therefor, and means for securing the same in place; an intake or down spout made to pass through suitable openings in said cover, and ledge, the lower end of which opens into said lower compartment near the bottom thereof, while the opposite end is detachably connected with suitable means whereby it may be connected with a conduit pipe, made to receive and convey the deleterious gases from their place of origin; means whereby said down spout is secured to the wall of said tank; means for giving to said spout where it passes through said ledge, and likewise where it passes through said cover, when the same is in place, substantially air-tight and germ-proof joints, and means for connecting said spout with said conduit pipe; a second perforated division plate, together with separating means which are carried by said cover and made to engage the upper surface of said plate, whereby the residuary portion of said tank, above the lower chamber, is divided into an air chamber above, and a middle chamber or compartment below, adapted to receive and contain a suitable filtering material; together with an escape or outlet pipe connected with said air chamber, and a suitable valve for controlling the same; all in combination and substantially as set forth.

2. In a device of the character described, a divided gas receptacle, having three several compartments therein, upper, lower, and middle, the lower compartment being adapted to contain a suitable disinfecting fluid, the upper compartment being an air chamber, and the middle compartment being filled with a suitable filtering material; perforated separating plates between said compartments, one between the upper and middle, and one between the middle and lower compartments; supporting means for the lower of said plates, such that all gases which may be conducted to said lower compartment are made to pass through said filtering material; a suitable conductor for said gases, which at one end is connected with said lower compartment, and at the other is adapted to be connected with a conduit pipe, made to receive and convey the deleterious gases from their place of origin; automatic controlling means for said air chamber, made to regulate and control the escape of gases therefrom; a cover for said receptacle, and means whereby said cover may be secured to the same with substantially an air tight joint; all in combination and substantially as set forth.

In testimony whereof we affix our signatures in presence of two witnesses.

ARTHUR G. WALTER.
B. M. INMAN.

Witnesses:
    FRANK J. TUTTLE,
    E. LOUDENSLEGER.